(12) United States Patent
Duncan et al.

(10) Patent No.: US 10,724,660 B2
(45) Date of Patent: Jul. 28, 2020

(54) FLEXIBLE REINFORCED PIPE AND REINFORCEMENT TAPE

(71) Applicant: SHAWCOR LTD. SHAWCOR LTÉE, Toronto (CA)

(72) Inventors: Mark Duncan, Calgary (CA); Hao Niu, Calgary (CA); Jeffrey Ryan Conley, Calgary (CA); Stephen James Edmondson, Oakville (CA); Jiri Holub, Etobicoke (CA); Alfredo Andrenacci, Scarborough (CA); Nitin Gujare, Mississauga (CA)

(73) Assignee: SHAWCOR LTD. SHAWCOR LTEE, Toronto (CA)

( * ) Notice: Subject to any disclaimer, the term of this patent is extended or adjusted under 35 U.S.C. 154(b) by 0 days.

(21) Appl. No.: 15/638,089

(22) Filed: Jun. 29, 2017

(65) Prior Publication Data
US 2017/0299093 A1 Oct. 19, 2017

Related U.S. Application Data

(63) Continuation of application No. 13/679,810, filed on Nov. 16, 2012, now Pat. No. 9,726,306.
(Continued)

(51) Int. Cl.
*F16L 11/24* (2006.01)
*B32B 7/03* (2019.01)
(Continued)

(52) U.S. Cl.
CPC ............... *F16L 11/24* (2013.01); *B32B 1/08* (2013.01); *B32B 5/02* (2013.01); *B32B 5/08* (2013.01);
(Continued)

(58) Field of Classification Search
CPC ........ F16L 11/083; F16L 11/082; B32B 7/03; B32B 5/12; B32B 5/08; B32B 5/26;
(Continued)

(56) References Cited

U.S. PATENT DOCUMENTS 2,810,424 A 10/1957 Swartswelter et al.
2,815,043 A 12/1957 Kleiner et al.
(Continued)

FOREIGN PATENT DOCUMENTS

CA 2513506 A1 8/2004
CA 2753024 A1 9/2010
(Continued)

OTHER PUBLICATIONS

A. G. Gibson, FRC '98, Consolidating New Applications, Seventh International Conference on Reinforced Composites, Conference Proceedings, Apr. 15-17, 1998, University of Houston Libraries.

*Primary Examiner* — James C Yager
(74) *Attorney, Agent, or Firm* — Bennett Jones LLP

(57) ABSTRACT

A flexible pipe includes: an inner liner formed as a tube and having an outer surface and an inner surface defining an inner diameter; a reinforcement layer bonded to the inner liner and including at least a first ply of reinforcing tape helically wrapped in a first helical direction about the inner liner and a second ply of reinforcing tape helically wrapped about the first ply of reinforcing tape, the second ply of reinforcing tape helically wrapped in a second helical direction opposite to the first helical direction; and an outer jacket applied over and bonded to the reinforcement layer, the outer jacket including a thermoplastic. A reinforcing tape for use in the pipe or other applications includes: a plurality of reinforcing fibers and a matrix about the plurality of reinforcing fibers to hold the reinforcing fibers in the form of a
(Continued)

tape, the matrix including thermoplastic and an additive to increase the impact resistance of the thermoplastic.

6 Claims, 1 Drawing Sheet

Related U.S. Application Data

(60) Provisional application No. 61/560,591, filed on Nov. 16, 2011.

(51) Int. Cl.
| | |
|---|---|
| *B32B 25/14* | (2006.01) |
| *B32B 27/08* | (2006.01) |
| *B32B 27/30* | (2006.01) |
| *B32B 27/32* | (2006.01) |
| *B32B 1/08* | (2006.01) |
| *B32B 5/02* | (2006.01) |
| *B32B 5/08* | (2006.01) |
| *B32B 5/12* | (2006.01) |
| *B32B 5/26* | (2006.01) |
| *B32B 27/12* | (2006.01) |
| *B32B 27/18* | (2006.01) |
| *B32B 27/34* | (2006.01) |
| *F16L 11/08* | (2006.01) |

(52) U.S. Cl.
CPC .............. *B32B 5/12* (2013.01); *B32B 5/26* (2013.01); *B32B 7/03* (2019.01); *B32B 25/14* (2013.01); *B32B 27/08* (2013.01); *B32B 27/12* (2013.01); *B32B 27/18* (2013.01); *B32B 27/302* (2013.01); *B32B 27/306* (2013.01); *B32B 27/32* (2013.01); *B32B 27/34* (2013.01); *F16L 11/082* (2013.01); *F16L 11/083* (2013.01); *B32B 2260/023* (2013.01); *B32B 2262/00* (2013.01); *B32B 2262/101* (2013.01); *B32B 2270/00* (2013.01); *B32B 2307/50* (2013.01); *B32B 2307/558* (2013.01); *B32B 2307/7265* (2013.01); *B32B 2597/00* (2013.01); *Y10T 428/1352* (2015.01)

(58) Field of Classification Search
CPC .. B32B 5/02; B32B 1/08; B32B 27/12; B32B 27/34; B32B 27/18; B32B 27/08; B32B 27/27; B32B 27/32; B32B 27/30; B32B 25/14; B32B 2307/7265; B32B 2307/558; B32B 2307/50; B32B 2307/00; B32B 2260/023; B32B 2262/00; B32B 2262/101; B32B 2597/00; B32B 27/302; B32B 27/306; B32B 2270/00; Y10T 428/1352

See application file for complete search history.

(56) References Cited

U.S. PATENT DOCUMENTS

| | | |
|---|---|---|
| 3,117,597 A | 1/1964 | Fritz et al. |
| 3,235,289 A | 2/1966 | Jones |
| 3,481,369 A | 12/1969 | Ganahi |
| 3,536,104 A | 10/1970 | Lejeune |
| 3,604,461 A | 9/1971 | Matthews et al. |
| 3,905,398 A | 9/1975 | Johansen et al. |
| 3,948,292 A | 4/1976 | Goto et al. |
| RE29,112 E | 1/1977 | Carter |
| 4,023,835 A | 5/1977 | Ewing et al. |
| 4,081,302 A | 3/1978 | Drostholm et al. |
| 4,147,381 A | 4/1979 | Schwarz |
| 4,173,670 A | 11/1979 | VanAuken |
| 4,224,505 A | 9/1980 | Sturm |
| 4,248,062 A | 2/1981 | McLain et al. |
| 4,257,630 A | 3/1981 | Bartell et al. |
| 4,273,160 A | 6/1981 | Lowles |
| 4,299,082 A | 11/1981 | Tarantola |
| 4,343,333 A | 8/1982 | Keister |
| 4,347,090 A | 8/1982 | Anderson et al. |
| 4,384,595 A | 5/1983 | Washkewicz et al. |
| 4,431,034 A | 2/1984 | Abdullaev et al. |
| 4,437,616 A | 3/1984 | Magarian et al. |
| 4,504,086 A | 3/1985 | Carrow |
| 4,514,244 A | 4/1985 | Shaefer et al. |
| 4,515,737 A | 5/1985 | Karino et al. |
| 4,601,496 A | 7/1986 | Ulrich et al. |
| RE32,230 E | 8/1986 | Satoh et al. |
| 4,676,276 A | 6/1987 | Fawley |
| 4,770,442 A | 9/1988 | Sichler |
| 4,818,318 A | 4/1989 | McMahon et al. |
| 4,850,395 A | 7/1989 | Briggs |
| 4,860,798 A | 8/1989 | Kovacs et al. |
| 4,898,212 A | 2/1990 | Searfoss et al. |
| 4,927,184 A | 5/1990 | Bourjot et al. |
| 5,024,252 A | 6/1991 | Ochsner |
| 5,052,444 A | 10/1991 | Messerly et al. |
| 5,108,135 A | 4/1992 | Mercado |
| 5,125,690 A | 6/1992 | Taylor et al. |
| 5,127,116 A | 7/1992 | Greig |
| 5,163,713 A | 11/1992 | Brettell et al. |
| 5,228,186 A | 7/1993 | Brettell et al. |
| 5,252,810 A | 10/1993 | Trosch et al. |
| 5,261,462 A | 11/1993 | Wolfe et al. |
| 5,268,050 A | 12/1993 | Azari |
| 5,316,046 A | 5/1994 | Igarashi et al. |
| 5,338,920 A | 8/1994 | Okusaka et al. |
| 5,364,130 A | 11/1994 | Thalmann |
| 5,398,974 A | 3/1995 | Mlzukawa et al. |
| 5,407,436 A | 4/1995 | Toft et al. |
| 5,425,981 A | 6/1995 | Bruning et al. |
| 5,445,191 A | 8/1995 | Green et al. |
| 5,445,848 A | 8/1995 | Venzi et al. |
| 5,618,065 A | 4/1997 | Aklyama |
| 5,629,062 A | 5/1997 | Ejiri et al. |
| 5,674,588 A | 10/1997 | Porfido et al. |
| 5,778,908 A | 8/1998 | Murakami |
| 5,988,689 A | 11/1999 | Lever |
| 6,039,084 A | 3/2000 | Martucci et al. |
| 6,059,319 A | 5/2000 | Wyke |
| 6,109,306 A | 8/2000 | Kleinert |
| 6,112,771 A | 9/2000 | Aoyagi et al. |
| 6,164,702 A | 12/2000 | Hauber et al. |
| 6,406,063 B1 | 6/2002 | Pfeiffer |
| 6,478,338 B1 | 11/2002 | Dalmolen et al. |
| 6,497,956 B1 | 12/2002 | Phillips et al. |
| 6,656,318 B1 | 12/2003 | Sabouraud et al. |
| 6,670,005 B2 | 12/2003 | Kinura et al. |
| 6,716,503 B1 | 4/2004 | Hauber |
| 6,773,773 B2 | 8/2004 | Hauber |
| 6,804,942 B2 | 10/2004 | Bryant |
| 6,807,988 B2 | 10/2004 | Powell et al. |
| 6,844,040 B2 | 1/2005 | Pabedinskas et al. |
| 6,889,716 B2 | 5/2005 | Lundberg et al. |
| 6,893,604 B2 | 5/2005 | Hauber |
| 6,902,205 B2 | 6/2005 | Bouey et al. |
| 7,063,118 B2 | 6/2006 | Rauber et al. |
| 7,093,620 B2 | 8/2006 | Dehennau et al. |
| 7,166,177 B2 | 1/2007 | Friedrich et al. |
| 7,238,400 B2 | 7/2007 | Gerez et al. |
| 7,293,590 B2 | 11/2007 | Martin |
| 7,600,537 B2 | 10/2009 | Bhatnagar et al. |
| 7,781,040 B2 | 8/2010 | Coyle |
| 7,946,629 B2 | 5/2011 | Conley et al. |
| 8,042,252 B2 | 10/2011 | Conley et al. |
| 8,398,119 B2 | 3/2013 | Kenworthy |
| 2002/0054968 A1 | 5/2002 | Hauber |
| 2002/0100516 A1 | 8/2002 | Powell et al. |
| 2002/0150752 A1 | 10/2002 | Debalme et al. |
| 2003/0026928 A1 | 2/2003 | Bryant |
| 2003/0037775 A1 | 2/2003 | Kong |
| 2003/0127147 A1 | 7/2003 | Van Dam et al. |

(56) References Cited

U.S. PATENT DOCUMENTS

| | | |
|---|---|---|
| 2003/0209312 A1 | 11/2003 | Hauber |
| 2004/0089405 A1 | 5/2004 | Friedrich et al. |
| 2004/0144440 A1 | 7/2004 | Bouey et al. |
| 2005/0143495 A1 | 6/2005 | Padareva et al. |
| 2005/0183785 A1 | 8/2005 | Lundberg et al. |
| 2005/0189029 A1 | 9/2005 | Quigley et al. |
| 2005/0287326 A1 | 12/2005 | Schunke et al. |
| 2006/0127620 A1 | 6/2006 | Fisher |
| 2007/0028983 A1 | 2/2007 | Lord et al. |
| 2007/0062595 A1 | 3/2007 | Bhatnagar et al. |
| 2007/0200342 A1 | 8/2007 | Roberts-Moore et al. |
| 2007/0277895 A1 | 12/2007 | Zandiyeh |
| 2008/0036198 A1 | 2/2008 | Roberts-Moore et al. |
| 2008/0047657 A1 | 2/2008 | Jander |
| 2008/0185042 A1 | 8/2008 | Feenchan et al. |
| 2008/0210329 A1 | 9/2008 | Quigley et al. |
| 2009/0011210 A1 | 1/2009 | Gao et al. |
| 2009/0097910 A1 | 4/2009 | Cloos et al. |
| 2010/0218839 A1 | 9/2010 | Conley et al. |
| 2010/0266789 A1 | 10/2010 | Conley et al. |
| 2010/0291342 A1 | 11/2010 | Jung et al. |
| 2011/0260354 A1 | 10/2011 | Ramli et al. |

FOREIGN PATENT DOCUMENTS

| | | |
|---|---|---|
| CN | 2268175 Y | 11/1997 |
| EP | 0385731 A1 | 9/1990 |
| EP | 0750973 A2 | 1/1997 |
| EP | 0969236 A2 | 1/2000 |
| EP | 0972980 | 1/2000 |
| GB | 1199447 | 7/1970 |
| GB | 1263060 A | 2/1972 |
| GB | 1444560 | 8/1976 |
| JP | 2003207077 A | 7/2003 |
| WO | WO 03/086756 A1 | 10/2003 |
| WO | WO2011/053141 A1 | 5/2011 |

FLEXIBLE REINFORCED PIPE AND REINFORCEMENT TAPE

CROSS REFERENCE TO RELATED APPLICATIONS

This application is a continuation of U.S. application Ser. No. 13/679,810 filed Nov. 16, 2012, which is presently pending and which claims benefit of U.S. Provisional Application No. 61/560,591 filed Nov. 16, 2011.

FIELD

The present invention relates to pipe for conveying fluids and, in particular, to flexible, fiber reinforced pipe. The present invention also relates to a reinforcement tape for use to construct reinforced products.

BACKGROUND

Flexible pipes are needed for conveying fluids such as water, sour gas, carbon dioxide and hydrocarbons, some of which may be pressurized.

It is desirable that the pipe be flexible enough to be, for example, installed using a plough chute without collapsing or buckling, even in low temperature environments. The pipe should also be capable of containing high pressure flows under conditions of use, such as when buried, unrestrained and bent.

SUMMARY

A flexible pipe has been invented for conveying fluids. A reinforcing tape has also been invented.

In accordance with one aspect of the present invention, there is provided a flexible pipe comprising: an inner liner formed as a tube and having an outer surface and an inner surface defining an inner diameter; a reinforcement layer bonded to the inner liner and including at least a first ply of reinforcing tape helically wrapped in a first helical direction about the inner tubular liner and a second ply of reinforcing tape helically wrapped about the first ply of reinforcing tape, the second ply of reinforcing tape helically wrapped in a second helical direction opposite to the first helical direction; and an outer jacket applied over and bonded to the reinforcement layer, the outer jacket formed of a thermoplastic.

In accordance with another aspect of the invention, there is provided a flexible pipe comprising: an inner liner formed as a tube and having an outer surface and an inner surface defining an inner diameter; a reinforcement layer applied about the inner liner and including at least a first ply of fiber reinforcements helically wrapped in a first helical direction about the inner liner and a second ply of fiber reinforcements helically wrapped about the first ply, the second ply helically wrapped in a second helical direction opposite to the first helical direction; and an outer jacket applied over the reinforcement layer, the inner liner, the reinforcement layer and the outer jacket each including a thermoplastic and the inner liner having an outer diameter and a wall thickness and an outer diameter to wall thickness ratio of 30:1 to 50:1.

In accordance with another aspect of the invention, there is provided a reinforcing tape comprising: a plurality of reinforcing fibers and a matrix about the plurality of reinforcing fibers to hold the reinforcing fibers in the form of a tape, the matrix including thermoplastic.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention.

Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DETAILED DESCRIPTION OF THE INVENTION

Figure 1:
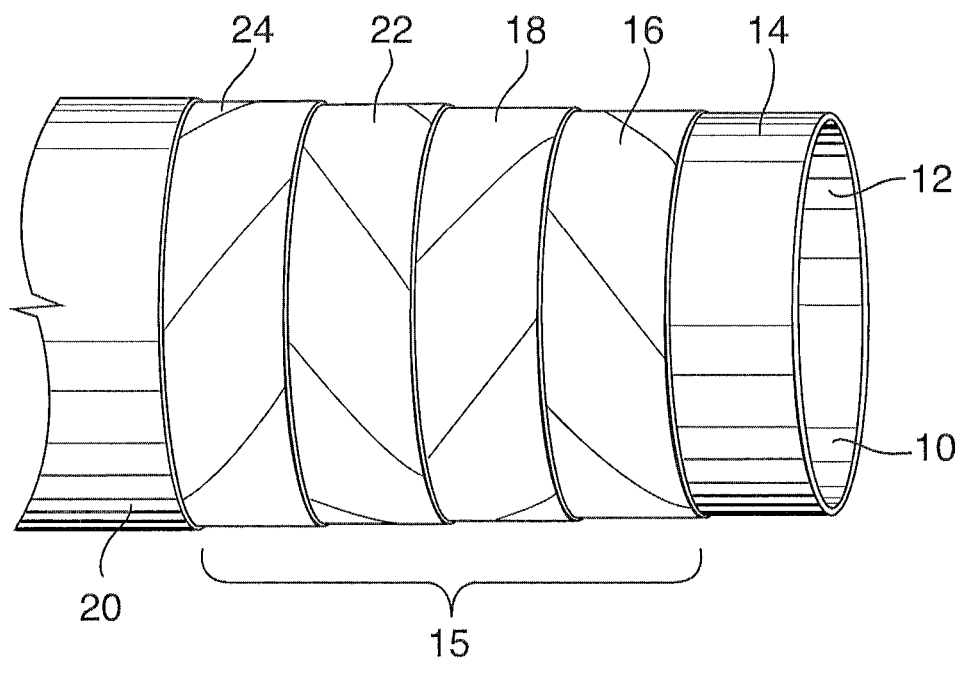
FIG. 1 is a perspective view, partly cut away in successive layers, of an embodiment of a pipe.

The description that follows, and the embodiments described therein, are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

A flexible pipe has been invented for conveying fluids. The pipe is flexible even when used in freezing temperature conditions such that it can be installed for example using a plough chute. The pipe can contain pressure when buried, unrestrained and bent. The pipe exhibits impact resistance under normal handling.

In one embodiment, a flexible pipe has been invented including: an inner liner having an inner surface and an outer surface; a reinforcement layer including at least a first ply of fiber reinforcements helically wrapped in a first helical direction about the inner tubular liner and a second ply of fiber reinforcements helically wrapped about the first ply, the second ply helically wrapped in a second helical direction opposite to the first helical direction, and an outer jacket applied over the reinforcement layer.

In one embodiment, the inner liner, the reinforcement layer and the outer jacket each contain a thermoplastic. The plys of reinforcements may include reinforcing fibers in a matrix containing thermoplastic and the inner liner and the outer jacket may each include at least one layer of a thermoplastic. The thermoplastic may have one or more of the following characteristics: (i) a softening temperature greater than 100° C., (ii) a brittleness temperature less than −60° C., (ii) a melt temperature of 120 to 300° C., (iii) a tensile strength of 16 to 100 MPa, (iv) an elongation to break of 100 to 1000%, (v) resistance to fatigue cracking when subjected to 1 million cycles at 1% strain, and (vi) a notched IZOD impact strength greater than 30 J/m. In one embodiment, the inner liner, the reinforcement layer and the outer jacket each contain the same type or compatible types of thermoplastic and that thermoplastic has all of the above noted attributes (i) to (vi) and are capable of becoming fused together.

The thermoplastic's low melt temperature offers a moldability that allows pipe components to be readily fused to other components, such as during construction or connection of a pipe to another pipe or to a coupling. For example, by forming parts of the same type of thermoplastic, they can be fused together when heated above the melt temperature of that thermoplastic.

The thermoplastic's low brittleness temperature and high elongation provide the pipe with a flexibility suitable for installation by ploughing into the ground.

The thermoplastic resistance to fatigue cracking enables the pipe to achieve fatigue performance of greater than 730,000 pressure cycles from atmospheric to maximum allowable pressure without leaking.

The thermoplastic impact strength allows the pipe to withstand a 125 J impact at −25° C., and retain sufficient strength to satisfy a 20 year maximum operating pressure for the pipe.

The thermoplastic has excellent chemical resistance, which makes the pipe suitable for conveyance of water, $CO_2$, and gaseous and liquid hydrocarbons.

Examples of suitable thermoplastic types include polyamides, polyethylene and polypropylene.

In one embodiment, the plys are handled in the form of a tape.

Referring to FIG. 1, a pipe 8 according to the present invention is shown. The pipe includes an inner tubular liner 10 having an inner surface 12 and an outer surface 14, a reinforcement layer 15 including a first ply 16 of reinforcing tape helically wrapped about the inner liner and a second ply 18 of reinforcing tape helically wrapped about the first ply of reinforcing tape and an outer jacket 20 applied outwardly of the second ply. The first ply of reinforcing tape is wrapped either clockwise or counterclockwise and the second ply is wrapped in the other of the clockwise or counterclockwise directions, when compared to the first ply. Thus, stated another way, it may be said that one ply is wrapped at a positive helical angle and the other ply is wrapped in a negative helical angle.

While the pipe may include a reinforcement layer with only two plies of reinforcing tape, the embodiment illustrated in FIG. 1 includes a reinforcement layer with a total of four plies including two further plies 22, 24 in addition to the first ply 16 and the second ply 18.

Pipe 8 may have various diameters such as of 50 to 600 mm (2 to 24 inches) inner diameter, but can even support larger diameters such as of 125 to 600 mm (5 to 24 inches) inner diameter with maximum operating internal pressure ranges from 50 to 500 bar. Generally, the inner diameter is between 125 to 300 mm at this operational pressure range.

While being formable as a large diameter composite pipe, the pipe retains useful properties such as being self supporting and flexible with good pressure containment and impact resistance. Pipe 8 may be formed in discrete lengths or may be formable into longer lengths, as by connecting a plurality of shorter length pipes end to end. The longer lengths may be spoolable for convenient handling.

The pipe may have a fully bonded construction. For example, in one embodiment, the reinforcement layer is fully bonded to inner liner 10 and to outer jacket 20 and each ply of tape in the reinforcement layer is bonded to the plies radially inwardly and radially outwardly of it. The reinforcement layer, therefore, may have a high inter-ply shear strength. Bonding may be achieved by thermoplastic melt fusion, which may include heating the materials to be contacted to a temperature above their melt temperature, bringing the materials into contact, and allowing the materials to cool at which time the contacted materials become fused together. In one embodiment, for example, a "thermoplastic tape placement" method may be employed whereby the thermoplastic tape and the substrate over which the tape is being applied are heated above their melting points. At the zone of contact, the tape is forced onto the substrate, for example, with a compaction roller. As a result of heat and pressure the tape and the substrate are fused together.

Inner liner 10 is tubular having an inner diameter defined by inner surface 12 that is open for the passage of fluids therethrough. The reinforcement layer is applied over outer surface 14 of the liner.

The liner is selected to act as a leak and permeation barrier. The liner should be formed of the most molecularly impervious polymer that meets acceptable material costs, as determined by a cost benefit analysis. Generally, the liner should be selected to minimize diffusion of gaseous components of the fluid being conveyed. As will be appreciated, the liner is selected to be substantially resistant to degradation by the fluid to be passed therethrough.

The liner is as thin as possible. In particular, liner 10 can be as thin as it can be manufactured, thus reducing weight and material cost, and improving the flexibility of the pipe. For example, bearing in mind that the pipe diameter may be relatively large, for example offered in diameters of about 6, 8, 10 or 12 inches, the liner may be less than less than 4 mm thick and may have an outside diameter to wall thickness ratio of 30:1 to 50:1. When the pipe is manufactured, the liner can be supported by an internal steel mandrel and, therefore, the liner is not required to support the loads induced by application of the outer layers such as during the winding process of reinforcing plies and the subsequent application of outer jacket 20.

As noted above, the liner includes a thermoplastic. In one embodiment, the liner includes a main tubular component formed of thermoplastic. Currently, polymers of greatest interest are polyamides, polypropylenes or polyethylenes such as high density polyethylene (HDPE). For petroleum operations, HDPE is particularly useful as it provides good chemical compatibility with many oilfield chemicals at a reasonable cost.

In some embodiments, the liner or a ply thereof is filled, for example, with amorphous clays, chopped glass or carbon fibers. These materials can enhance liner stability, for example, against low temperature cracking, against polymer creep for long term integrity and may enhance the initial strength of the liner following extrusion. The fibers can be aligned or random.

In some embodiments, the liner may be a tubular laminate including a plurality of tubular layers. A multi-layered liner can include, for example, more than one layer of the same material or of different materials. Particular layers may be selected to confer various performance characteristics to the liner. For example, one layer in a multi-layered liner may confer resistance to degradation by the fluid being conveyed, and another layer may confer resistance to permeation of gaseous components of the fluid being conveyed. In one embodiment, for example, to enhance resistance to gas permeation, a barrier layer may be employed. For example, a polymeric barrier layer of material with high permeation resistance to gas may be employed. Examples of permeation resistant materials are polyamides and ethylene vinyl alcohol. Such a material may be positioned adjacent inner surface 12.

While the liner may be formed in various ways, extrusion offers a simple and rapid means of production. A multi-layered liner may be made, for example, by coextrusion of the various layers, as is known in the art.

The reinforcement layer, including the number of plies of reinforcement tape, the nature of the tape and the construction, determines, for the most part, many of the operational parameters of the pipe including, for example, burst strength, pressure holding capability, flexibility, etc. For example, the number of tape plies can be selected to determine the pressure class of the pipe, with fewer plies offering a lower pressure holding pipe.

Generally there are at least two plies of tape in the reinforcing layer of the pipe, the plies of reinforcing tape are configured with one ply wound in a positive or clock-wise helical direction and the other ply wound in a negative or counter-clockwise helical direction. One or more further plies of reinforcing tape may be applied between the inner liner and the outer jacket. Generally, as shown, further plies of reinforcing tape are added in pairs with one of the pair of plies wrapped in a positive helical direction and the other of the pair of plies wrapped in a negative helical direction. In a four ply pipe, as shown for example, plies 16, 18, 22, 24 of reinforcing tape are configured with two plies wound in a positive or clock-wise helical direction and the other two plies wound in a negative or counter-clockwise helical direction. The plies generally alternate in their winding direction from inside to outside. A ply is one or more substantially continuous lengths of tape wound at the same angle and direction onto the underlying liner or tape ply.

Figure 2:
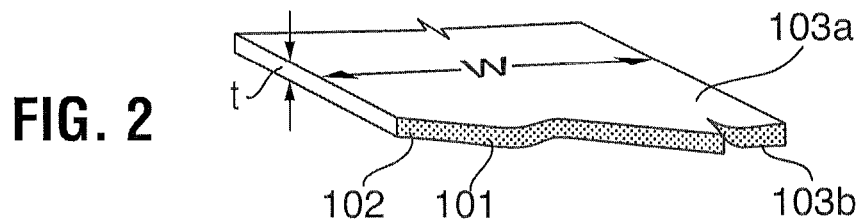
FIG. 2 is a perspective view, partly cut away of a reinforcing tape.

The tape employed to form the plies can be configured in various ways from pipe to pipe and from ply to ply. In an embodiment as shown in FIG. 2, a tape includes a plurality of reinforcing fibers 101 in a matrix 102.

The reinforcing tape has a length much greater than its width w and the reinforcing fibers extend along the length of the tape to react loads along the length of the tape regardless of its orientation (i.e. when wrapped circumferentially, the tape reacts circumferential loads resulting from, for example, internal pressure). The fibers should also be resistant to degradation by chemicals, such as hydrocarbons and water, intended to be handled, or environmentally present, during use of the pipe. Suitable fibers include, for example, glass, carbon, nylon, polyester or aramid. For petroleum operations, glass fibers are of greatest interest due to the low cost and ability to carry the required loads. Elongation to failure of fiber glass is generally less than 3.0% and exhibit a filament strength greater than 1,600 MPa. Particularly useful glass fibers may be very straight and have low boron content of typically less than 1% by weight.

The tape includes 30 to 80% reinforcement fiber by weight, with 50 to 70% by weight fiber content being quite useful for embodiments employing glass fiber reinforcements.

The reinforcing tape includes a thermoplastic matrix. As noted above, the thermoplastic is selected to exhibit characteristics that ensure the flexibility and durability of the pipe. For example, the thermoplastic in one embodiment is HDPE. The reinforcing tape may further have a strength optimized by selection of the thermoplastic matrix composition. The tape's impact resistance may also be optimized by selection of the thermoplastic matrix composition.

To enhance the bonding of the matrix to the reinforcing fibers, the matrix may include a coupling agent. The inclusion of a coupling agent has been shown to increase the shear strength and the tensile strength of the tape. The coupling agent also assists the fusion of the reinforcement layer to the jacket and the liner. For example, the matrix of the reinforcing tape may include in excess of 5% by weight content coupling agent, with the most useful range determined to be between 8 and 20% by weight. An example of a suitable coupling agent for use with high density polyethylene is maleic anhydride grafted polyethylene. The inclusion of maleic anhydride grafted polyethylene to HDPE has shown to improve the shear strength and tensile strength of a thermoplastic reinforcement tape by 20% when the coupling agent content was increased from 5% to 18% by weight of the matrix.

The matrix composition tape may include additives to improve the impact resistance of the matrix and, therefore, the tape and the pipe. Specific to HDPE thermoplastic, impact modifier additives of particular interest are rubber, ethylene vinyl acetate (EVA), styrene butadiene styrene (SBS), styrene isoprene styrene (SIS), styrene ethylene butylene styrene (SEBS) and polyethylene such as medium density polyethylene. Such additives may be added in the range of 1 to 40% by weight of thermoplastic. SEBS, for example, may be added in the range of 3 to 13% by weight thermoplastic content. As another example, the medium density polyethylene may be added in the range of 10 to 30% by weight thermoplastic. A useful combination has been determined to be 7 to 10% SEBS and 16 to 18% medium density polyethylene, each by weight in HDPE. When compared to HDPE alone, a matrix containing 8% SEBS and 17% medium density polyethylene in HDPE increased the impact resistance of the matrix composition from 31 to 400 J/m (notched Izod).

An example of a suitable SEBS is Kraton™ G1657, which is a clear, linear triblock copolymer based on styrene and ethylene/butylene with a polystyrene content of about 13%. An example of a suitable medium density polyethylene is Nova™ RMs539U, which has a density of about 0.9 g/cc and in one embodiment has a density of 0.939 g/cc.

The thermoplastic matrix can contain both the coupling agent and the additive for improved impact resistance, as described above.

In one embodiment, the thermoplastic matrix has a high melt index of, for example, 9 to 60. The high melt index ensures adequate impregnation of the matrix into the reinforcing fibers. The tape void content should be no more than 5% and in one embodiment is no more than 3%.

The dimensions of the reinforcing tape may vary, but in one embodiment, they are selected for ease of manufacture. For example, the tape can be relatively thick and wide, for example, having a thickness t between its upper surface 103a and its lower surface 103b in the range 0.6 to 1.5 mm for example, 0.7 to 1.1 mm. The tape can have a width w of 25 to 40% or 30 to 35% of the pipe outer diameter to facilitate tape placement, meaning that for most large diameter embodiments the tape has a width of greater than 45 mm. The large thickness and width of the tape allows the pipe to be efficiently manufactured, for example, using a tape placement method.

The angle of winding of each ply 16, 18 is selected to maximize strength, primarily in the circumferential direction, but also to address axial loads. Winding angles of between about 8° and 86° can be used. In one embodiment, winding angles of between 40° and 70° are used, in one embodiment with winding angles of between 50° and 60°. In one embodiment, the plies of each pair are selected to have substantially equal load carrying capability. For example, the first and second plies can use similar tape, have substantially equal but opposite winding angles and be applied in substantially equal quantities.

Outer jacket 20 surrounds the reinforcement layer including plies 16 and 18, and in this embodiment plies 22 and 24, of tape. While the pipe will function to contain pressurized fluids without the outer jacket, it acts to protect the reinforcement layer from damage, as by cut, abrasion, and impact. In some embodiments, the outer jacket may also operate with a coupling to create a seal or to provide a pipe to pipe connection.

The outer jacket can be formed of any flexible material that can protect the reinforcing fibers to some degree and in this embodiment, capable of fusing to the underlying layer of the pipe. The outer jacket, in some embodiments, may also be selected to operate with the coupling system for pipe to pipe or ending fitting connections. As will be appreciated with consideration as to the intended use of the pipe, outer jacket 20 can be selected to be substantially resistant to degradation by environmental effects (i.e. ultraviolet light, weather, etc.) and by the chemicals that may come in contact with it. In this embodiment, as noted above, the outer jacket includes a thermoplastic and can be filled with reinforcements, if desired. Currently, the thermoplastic of greatest interest is a polyethylene, for example, HDPE.

As desired, the outer jacket can include or have attached thereto identifiers such as, for example, paint, coloration, bar-coding, chips, etc. or materials facilitating use or installation such as, for example, electrically conductive wire or survey locatable metal parts.

Outer jacket 20 may be coated with an insulation, if desired, for thermal insulation of environmental temperature to conduit temperature. Insulation may include polymers, foaming agents, etc.

Jacket 20 may be applied to the pipe in various ways. For example, the jacket materials can be applied as by extrusion, spraying, dipping, tape winding, shrink wrapping, braiding, etc. In one embodiment, the jacket is extruded onto the pipe. In another embodiment, a tape can be employed such as a HDPE tape, for example a neat (i.e. non-reinforced) or a low fiber content reinforced HDPE tape. The tape can be wound about the reinforcement layer using a tape placement method.

Pipe Production

With reference to FIG. 1, a pipe in accordance with the present invention can be produced by winding reinforcing tape about an inner liner 10 to form at least one ply 16 of reinforcing tape wrapped helically in a first direction and at least one ply 18 of reinforcing tape wrapped in an opposite direction. Ply 16 is fused to liner and ply 18 is fused to ply 18. Then a coating forming jacket 20 is applied over the outer most ply and the coating is fused to the outer most ply. In an embodiment, the pipe is produced using a process, wherein discrete lengths, for example of 10's of feet up to 80 or 100 feet or more, are produced. The lengths can be transported alone or connected end to end for spooling.

The liner can be formed in any desired way, with consideration as to the above noted description of the liner. In a preferred embodiment, the liner is produced by extrusion, providing continuous production thereof and is cut to desired lengths.

Winding can be accomplished by use of a winder that winds one or more lengths of tape in a helical fashion about the liner, as it is being advanced. The tape plys are wound about the liner while the liner is internally supported, if necessary. At least one length of tape is wound about the liner to form a first ply 16, which is in contact with and covers entirely the outer surface of the liner. Second ply 18 of tape is then wound about the first ply 16.

Further plys 22, 24 of reinforcing tape can be wound about second ply 18, as desired, as is shown. The winding direction is alternated with each subsequent ply. In addition, other layers can be applied such as coatings, etc. provided that they do not interfering with the ability of the fiber reinforcements to carry load, or otherwise significantly adversely effect the pipe performance.

Jacket 20 is then applied outwardly of the outer ply 24.

The ends of the pipe have sufficient integrity such that they can remain with the reinforcement layer exposed. Thus, an end cap ring may not be required.

Figure 3:
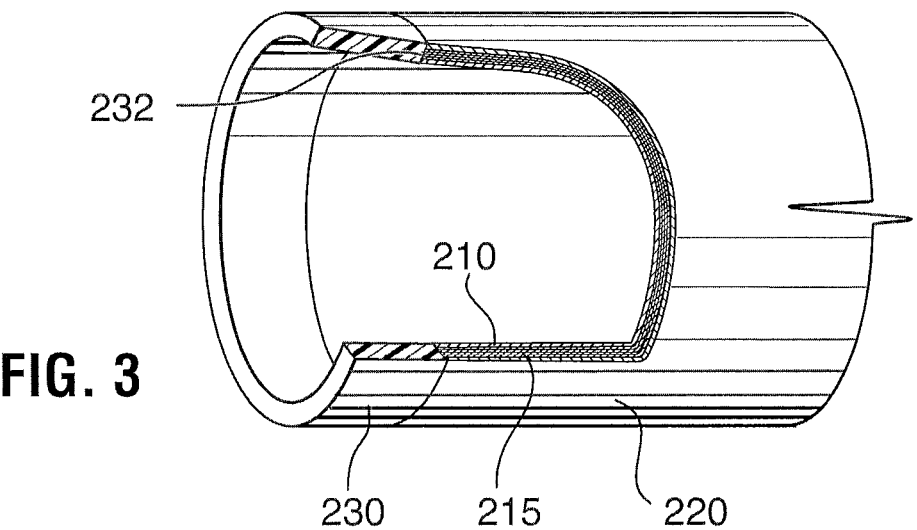
FIG. 3 is a perspective view, partly cut away, of an embodiment of a pipe.

However, if desired, an end cap can be installed on the pipe. For example, with reference to FIG. 3, a cap ring 230 may be installed at an end face 232 of a pipe. Cap ring 230 may protect and seal the otherwise exposed reinforcement layer 215 at the pipe end face. The cap ring, therefore, may be useful in applications where the pipe end face is exposed, such as during handling and transportation and in final installations such as in pipe connections where the end face is exposed. If employed in final installations, cap ring 230 serves to isolate the reinforcement layer at the pipe end face from the pressurised liquid or gas.

In one embodiment, cap ring 230 may be formed of a thermoplastic material and may be connected to the pipe end face by fusion to the pipe liner 210, reinforcement layer 215 and jacket 220. Fusing may be achieved using various methods such as, for example, butt fusion. The thermoplastic may be of the same type as that used in the pipe construction. HDPE is an example of a typical material.

The cap ring outer and inner diameters may match those of the pipe. The length of the cap ring is variable, but is typically in the range of 10 to 50 mm in length.

As an alternative to a cap ring, a layer of thermoplastic material may be applied to the exposed end surface between and overlapping the pipe liner and the jacket. The layer of thermoplastic material may be applied in various ways, as by spray deposition, extrusion, dipping, etc. The layer may be relatively thin, for example, having a thickness of 1 to 2 mm.

As noted, to obtain long lengths of pipe, shorter length pipes may be connected end to end. Fittings may be connected to the end of a pipe in order to facilitate the construction of a pipeline. In some embodiments, the outer jacket may operate with a coupling to create a seal or to provide a pipe to pipe or pipe to fitting connections. For example, a coupling may be installed by fusion with the outer coating. In so doing, the outer coating, which includes thermoplastic, is heated to a temperature above the melting temperature of the thermoplastic and the coupling may be installed thereover. In one embodiment, the coupling may include a liner of compatible thermoplastic, which is also heated to at least the melting temperature, such that jacket 20 and the liner of the coupling fuse.

If an end cap is used, the cap ring outside diameter may be sealed to the inside diameter of the coupling, providing a seal from the pipe to the coupling. Where the end cap and the coupling liner contain thermoplastic, fusion may be employed, thereby enabling the formation of a seal between pipe inner liner 210, 230 cap ring and the coupling inner surface.

Pipe Performance

An implementation of a pipe has been constructed and tested. The pipe having a diameter of about 172 mm performed as shown in Table I:

TABLE I

Performance

| | |
|---|---|
| Maximum Operating Pressure (MOP) | 51.7 bar [750 psi] |
| Burst pressure | >5 times maximum MOP |
| Impact resistance @ −25° C. while maintaining burst pressure | 245 J at an impact velocity of 7.3 m/s and R12.7 impacting tip |
| Bend radius | 3 m |
| Operating temperature range | −20 to 60° C. |
| Number of pressure cycles (0-MOP-0) to failure | 640,000 |

The foregoing is simply an example of a pipe and is not intended to limit the scope of the invention.

It will be apparent that many other changes may be made to the illustrative embodiments, while falling within the scope of the invention and it is intended that all such changes be covered by the claims appended hereto.

We claim:

1. A flexible pipe comprising: an inner liner formed as a tube and having an outer surface defining an outer diameter of 5 to 24 inches and an inner surface defining an inner diameter, the inner liner formed of a material including a thermoplastic material; a reinforcement layer of reinforcing tape bonded by melt fusion to the inner liner, the reinforcing tape having a thickness of 0.6 to 1.5 mm and a width of 25 to 40% of the outer diameter and including 50-70% glass fiber reinforcements by weight in a matrix composition and no more than 5% void content, the matrix composition including high density polyethylene (HDPE) and 8% to 20% by weight of maleic anhydride grafted polyethylene and the reinforcement layer including at least a first ply of the reinforcing tape helically wrapped in a first helical direction about the inner liner and a second ply of the reinforcing tape helically wrapped about, and bonded by melt fusion to, the first ply of the reinforcing tape, the second ply of the reinforcing tape helically wrapped in a second helical direction opposite to the first helical direction; and an outer jacket applied over and bonded by melt fusion to the reinforcement layer, the outer jacket including a thermoplastic.

2. The flexible pipe of claim 1 wherein the inner liner has an outer diameter to a wall thickness ratio of 30:1 to 50:1.

3. The flexible pipe of claim 1 wherein the reinforcing tape includes an additive to increase the impact resistance of the HDPE.

4. The flexible pipe of claim 3 wherein the additive is at least one of: rubber, ethylene vinyl acetate (EVA), styrene butadiene styrene (SBS), styrene isoprene styrene (SIS), styrene ethylene butylene styrene (SEBS) or a medium density polyethylene.

5. The flexible pipe of claim 4 wherein the matrix composition contains the styrene ethylene butylene styrene polymer in an amount of 3 to 13% by weight of the HDPE.

6. The flexible pipe of claim 4 wherein the matrix composition contains the medium density polyethylene in an amount of 10 to 30% by weight of the HDPE.

\* \* \* \* \*